United States Patent [19]

Caruthers et al.

[11] 4,372,157

[45] Feb. 8, 1983

[54] AERODYNAMIC DATA COLLECTION PROCEDURE

[75] Inventors: John E. Caruthers, Tullahoma, Tenn.; Robert L. Jay, Indianapolis, Ind.; Ronald E. Riffel, Indianapolis, Ind.; Mark D. Rothrock, Indianapolis, Ind.

[73] Assignee: General Motors Corporation, Detroit, Mich.

[21] Appl. No.: 251,907

[22] Filed: Apr. 7, 1981

[51] Int. Cl.³ .............................................. G01M 9/00
[52] U.S. Cl. ................................ 73/147; 29/156.8 B; 73/455; 73/583
[58] Field of Search ................. 73/147, 455, 456, 583; 29/156.8 B

[56] References Cited

U.S. PATENT DOCUMENTS 4,178,667  12/1979  Stevens et al. .................... 73/147 X

OTHER PUBLICATIONS

Whitehead, D. S., "Torsional Flutter of Unstalled Cascade Blades at Zero Deflection", from Technical Information & Library Services Ministry of Aviation, S and T Memo 12/63, Mar. 1964, Great Britain.

Snyder, L. E., "Supersonic Unstalled Torsional Flutter", from L. E. Snyder, SQUID Publication, pp. 164-183, Jun. 1972.

Primary Examiner—Edward R. Kazenske
Assistant Examiner—J. Chapman
Attorney, Agent, or Firm—Saul Schwartz

[57] ABSTRACT

An improved procedure for collecting experimental data reflecting the behavior of a time varying aerodynamic parameter at an airfoil in a cascade of airfoils vibrating harmonically in a fluid stream including the steps of vibrating the center airfoil of the cascade at a selected frequency and amplitude while each of the other airfoils is held rigid, measuring the time varying parameter at the center airfoil and expressing it as a function of the position of the center airfoil in its vibratory cycle, vibrating each of the other airfoils in turn at the selected frequency and any amplitude while maintaining all the remaining airfoils rigid, measuring the time varying parameter at the center airfoil for each individual airfoil vibration and expressing the measurement as a function of the position of the individual vibrating airfoil, expressing the position of each individual vibrating airfoil as a function of the position of the center airfoil, and combining the time varying parameter expressions and position expressions to reflect the time varying parameter behavior when all the airfoils vibrate harmonically at the selected frequency and any amplitude.

3 Claims, 4 Drawing Figures

AERODYNAMIC DATA COLLECTION PROCEDURE

FIELD OF THE INVENTION

This invention relates generally to blades and vanes for turbomachines and, more particularly, to an improved procedure for collection of experimental data reflecting behavior of time varying aerodynamic parameters in a cascade of oscillatory airfoils in a fluid stream.

PRIOR ART

In designing blades and vanes for turbomachines, extensive use is made of predictive mathematical analyses to maximize the probability of success for a particular blade or vane design. To be useful, however, any such analysis must correlate with reality. Accordingly, researchers continually collect experimental data by which their predictive analyses are tested and revised to more accurately reflect reality. One particular characteristic of blade and vane performance currently receiving attention is instability resulting from self-excited vibration of airfoils in fluid streams, such instability being commonly referred to as flutter. To test, verify, and extend the capability of analyses for predicting the occurrence of flutter, the acquisition of experimental data reflecting the time-unsteady pressure behavior around an airfoil in a cascade of harmonically vibrating airfoils is important and desirable. To that end, one successful experimental technique has included the steps of mounting a cascade of airfoils in a wind tunnel, instrumenting one of the airfoils with pressure transducers, connecting each of the airfoils to individual drive units capable of torsionally vibrating each airfoil at selected frequencies, amplitudes and relative phase angles, then simultaneously vibrating all of the air foils at the same frequency and amplitude and in constant phase relationship in a fluid stream in the wind tunnel while recording the time-unsteady or time-varying pressure at each of the pressure transducers. The resulting pressure data, then, represents a direct measure of the value of the time varying pressure at the particular phase angle, amplitude, and frequency chosen. While this technique provides useful data, it is expensive and time consuming to practice because of the substantial difficulty associated with actually maintaining a desired phase and amplitude relationship between a plurality of airfoils exposed to a fluid stream in a wind tunnel. A procedure for collecting time-varying aerodynamic data according to this invention represents an improvement over this and other heretofore known techniques.

SUMMARY OF THE INVENTION

The primary feature of this invention is that it provides an improved procedure for collecting time varying aerodynamic data for an airfoil in a cascade of harmonically vibrating airfoils wherein only one of the airfoils need be vibrated at a time, thereby avoiding the expense and delay associated with simultaneous vibration of airfoils at constant amplitude, frequency and phase relationship. Another feature of this invention is that it provides an improved procedure for collecting time varying aerodynamic data, particularly time varying pressure, including the steps of placing a cascade of airfoils in a wind tunnel fluid stream, instrumenting a center airfoil of the cascade to measure the desired time varying parameter, vibrating the center airfoil at a selected frequency and amplitude, and recording the time varying parameter and the corresponding motion of the airfoil, vibrating in turn each of the other airfoils at the same frequency as the center airfoil and at individual amplitudes which may or may not be equal to the amplitude of vibration of the center airfoil, while holding fixed all of the other airfoils, recording the time varying parameter at the center airfoil and the corresponding motion of the one vibrating airfoil, and then combining the time varying data collected during each individual airfoil vibration to provide the total time varying parameter behavior and reflecting the effect of simultaneous harmonic vibration of all airfoils in the cascade.

These and other features of this invention will be readily apparent from the following specification and from the drawings wherein.

Figure 1:
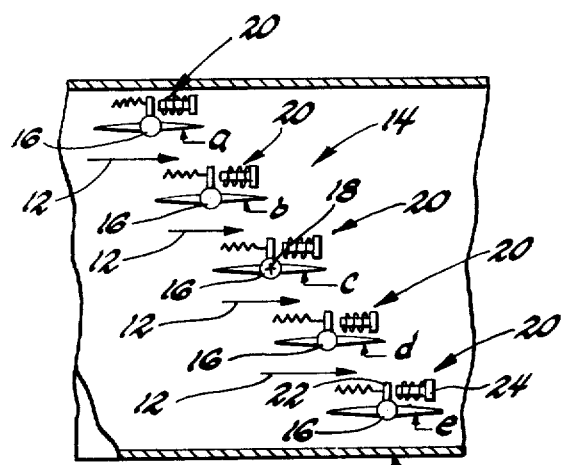
FIG. 1 is a schematic view of a cascade of airfoils in a wind tunnel fluid stream.

Referring now to FIG. 1 of the drawings, there shown in schematic representation is a wind tunnel 10 capable of providing a continuous fluid stream, typically air, in steady state fashion and at inlet Mach numbers in both subsonic and supersonic ranges. The fluid stream proceeds from left to right in FIG. 1 and is represented by arrows 12, the stream enveloping and passing over a cascade of airfoils designated generally 14 disposed in the wind tunnel. The cascade 14 includes a first airfoil a, a second airfoil b, a third airfoil c, a fourth airfoil d, and a fifth airfoil e. Each airfoil is supported in the fluid stream of the wind tunnel by a pair of aligned trunnions at opposite ends, only one trunnion 16 for each air foil being shown schematically in FIG. 1. The trunnions, disposed substantially outside the fluid stream, support each of the airfoils on the wind tunnel housing for pivotal movement about an axis of the airfoil perpendicular to the fluid stream, a typical axis 18 for the airfoil c being shown in FIGS. 1 and 2.

Associated with each airfoil in the cascade is a torsional drive arrangement 20 operative to torsionally vibrate the corresponding airfoil at a selected frequency and amplitude. The drive arrangements 20 may typically include a soft iron armature 22 secured to one of the airfoil trunnions and an electromagnetic vibrator 24 operative to excite the armature and thereby effect vibration of the airfoil. In addition to the torsional drive arrangement 20, each of the airfoils a, b, c, d and e includes clamping means, not shown, operative to lock the corresponding airfoil against vibration in the fluid stream.

Figure 2:
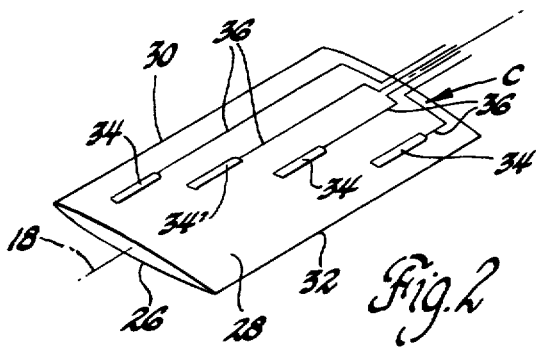
FIG. 2 is an enlarged perspective view of the center airfoil in the cascade of FIG. 1 showing instrumentation for determining a time varying parameter.

With reference now to FIGS. 1 and 2, the airfoils a, b, c, d and e are identical in aerodynamic configuration and are modeled after axial compressor blades in gas turbine engines. The airfoils are not, however, exact reproductions of compressor blades but rather are uniform in cross-section along their entire lengths, the cross-section representing an actual compressor blade cross section taken at a selected point along the length of the blade. Airfoil c, the center airfoil in the cascade, has a suction surface 26 and a pressure surface 28 which join at a leading edge 30 and a trailing edge 32 of the airfoil. The pressure surface 28 has a plurality of miniature high-response pressure transducers 34 embedded therein operative to measure time varying air pressure at the surface of the airfoil, each of the transducers being connected by a conductor 36 to an appropriate recording instrument, not shown, outside the wind tunnel. The suction surface 26 has a similar plurality of transducers, not shown, embedded therein for measuring time varying pressure at the suction surface.

Figure 3:
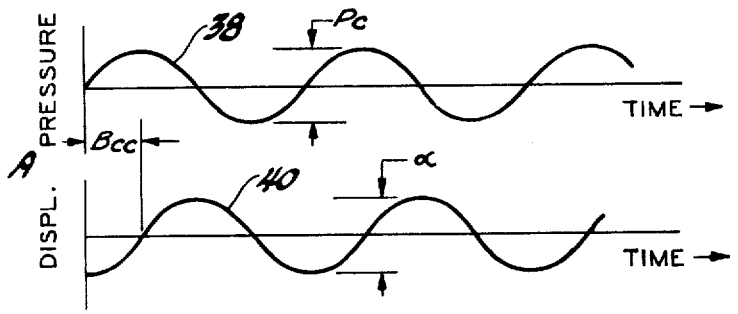
FIG. 3 is a series of diagrams depicting in graphic representation the relationships between the time varying parameter measured at the center airfoil and the motion of the individual airfoils in the cascade and the relative motion relationships between the airfoils.
Figure 3:
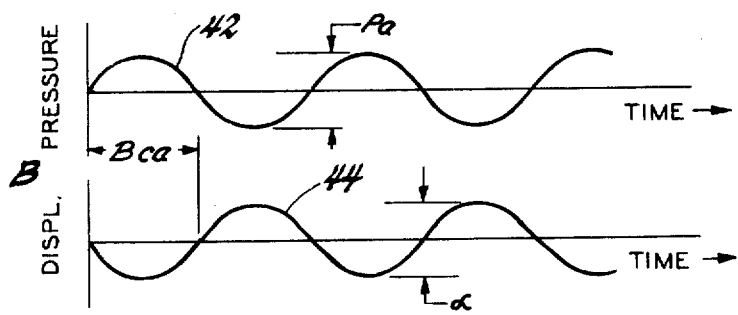
Figure 3:
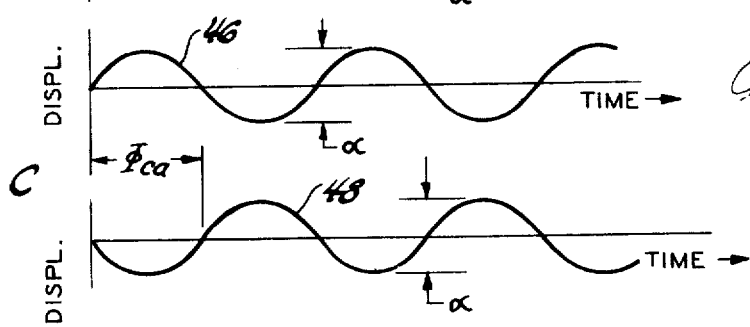

Proceeding now to a description of the data collection procedure according to this invention, it will first be apparent that the data taken from each of the individual transducers 34 can be treated and analyzed separately and without regard to the other transducers. Therefore, for simplification, the following discussion will be confined to data taken from only a single transducer 34', it being understood that the analysis is repeatable for each of the other transducers. With particular reference, then, to FIG. 3, the cascade 14 is subjected to a steady state fluid stream 12 in the wind tunnel of selected magnitude and each of the airfoils a, b, d and e is locked against vibration while the center airfoil c is vibrated at a selected frequency $\omega$ and through a selected amplitude $\alpha$. As the airfoil c vibrates the pressure at the airfoil surface, varying cyclically with time, is sensed by the transducer 34' and recorded, the instrumentation being operative to relate the time varying pressure at the transducer 34' to the movement of the vibrating airfoil c. Accordingly, a curve 38, FIG. 3A, can be drawn showing the magnitude of the pressure as a function of time and a similar curve 40, FIG. 3A, can be drawn depicting the torsional harmonic vibration of the airfoil c through the selected amplitude $\alpha$, the two curves being substantially sinusoidal and having the same frequency $\omega$ and period $\omega^{-1}$ but being phase separated by an angle $\beta cc$. As used throughout this specification $\beta$ represents the phase relationship between the time varying pressure and the motion of the vibrating airfoil, the first of the subscripts identifies the airfoil on which the time varying pressure is being measured, and the second of the subscripts identifies the airfoil being vibrated. In FIG. 3A, for example, the phase separation $\beta cc$ is 90°. In addition, the time varying pressure is normalized by dividing the amplitude of the pressure variation by the amplitude of vibration of the airfoil. Mathematically, normalization is described as follows:

$$C_{pc} = |P_c|/|\alpha_c|$$

where
  $C_{pc}$ = normalization factor for time varying pressure at the center airfoil due to vibration of airfoil c
  $|P_c|$ = amplitude of time varying pressure at the center airfoil change due to vibration of airfoil c
  $|\alpha_c|$ = amplitude of vibration of airfoil c
Further, since both curves 36 and 38 are substantially sinusoidal, the following relationship exists:

$$P_{cc} = C_{pc}|\alpha|e^{i(\omega t - \beta cc)}$$

where $P_{cc}$ = magnitude of the time varying pressure on airfoil c at time t due to vibration of airfoil c at frequency $\omega$ and amplitude $\alpha$.

In the next step in the procedure according to this invention, each of the airfoils b, c, d, and e is locked against vibration while first airfoil a is vibrated at the same frequency $\omega$ at which the center airfoil c was vibrated and at an arbitrarily selected amplitude $\alpha_a$. With the fluid stream in the wind tunnel maintaining its steady state condition, the time varying pressure at the transducer 34' on the center airfoil is sensed and recorded, the instrumentation being operative to then relate the time varying pressure at the transducer 34' to the motion of the vibrating airfoil a. Accordingly, a curve 42, FIG. 3B, can be drawn representing the time varying pressure on airfoil c due to vibration of airfoil a and a curve 44, FIG. 3B, can be drawn representing the vibratory motion of airfoil a, the two curves being substantially sinusoidal and phase displaced by an angle $\beta ca$, 180° in FIG. 3B. Additionally, the magnitude of the time varying pressure on airfoil c due to vibration of airfoil a is normalized by dividing the amplitude of the pressure change at airfoil c by the amplitude of vibration of airfoil a. Mathematically, again, pressure normalization for vibration of airfoil a is described as follows:

$$C_{pa} = |P_a|/|\alpha_a|$$

where
  $C_{pa}$ = normalization factor for time varying pressure at air foil c due to vibration of airfoil a
  $|P_a|$ = amplitude of time varying pressure at airfoil c due to vibration of airfoil a
  $|\alpha_a|$ = amplitude of vibration of airfoil a.
Further, since the curves 42 and 44 are, again substantially sinusoidal, the following relationship exists:

$$P_{ca} = C_{pa}|\alpha|e^{i(\omega t - \beta ca)}$$

where $P_{ca}$ = magnitude of time varying pressure on airfoil c at time t due to vibration of airfoil a at frequency $\omega$ and amplitude $\alpha$.

Continuing the procedure, the step just described for airfoil a is repeated again and again until each of airfoils b, d, and e has been vibrated with all of the other airfoils locked against vibration. In each step the time varying pressure at transducer 34' is recorded, normalized, and phase related to the motion of the particular airfoil being vibrated so that for each vibrating airfoil a pair of curves corresponding to the curves 38 and 40 and the curves 42 and 44 can be drawn. The phase relationships found by recording time varying pressure data during vibration of individual airfoils b, d and e is represented by the terms $\beta cb$, $\beta cd$ and $\beta ce$. Similarly, the normalization factors, calculated as described, are $C_{pb}$, $C_{pd}$, and $C_{pe}$.

Now, to derive meaningful data with respect to time varying pressure at airfoil c during simultaneous harmonic vibration of all airfoils at frequency $\omega$ and amplitude $\alpha$, it is necessary to linearly superimpose the normalized time varying pressures experienced at airfoil c during individual airfoil vibration. This is accomplished, first, by establishing certain phase relationships between vibration of the center airfoil c and each of the other airfoils and referencing all motion of the other airfoils to the motion of the center airfoil. For example, a sinusoidal curve 46, FIG. 3C, can be drawn representing harmonic vibration of center airfoil c at amplitude $\alpha$ and frequency $\omega$. If airfoil a is assumed to vibrate at the same frequency and amplitude as the center airfoil but at a phase lag of 180°, vibration of airfoil a is represented by a sinusoidal curve 48, FIG. 3C, displaced from curve 46 by a phase angle $\Phi_{ca} = 180°$, FIG. 3C. As used throughout the specification Φ represents the phase relationship between the vibration of the center airfoil and the vibration of the individual airfoils in the cascade 14, the first of the subscripts identifies the center airfoil, and the second of the subscripts identifies the one of the other airfoils for which the phase separation exists. Now, as shown previously, the normalized time varying pressure on center airfoil c due to vibration of, for example, airfoil a when all of the other airfoils are held stationary is given by $$P_{ca} = C_{pa} |\alpha| e^{j(\omega t - \beta ca)},$$

which equation is graphically represented by a sinusoidal curve and, since the center airfoil c and airfoil a vibrate harmonically but with a phase lag $\Phi_{ca}$, the time varying pressure on the center airfoil due to vibration of airfoil a, referenced to motion at airfoil c, is given by $$P_a' = C_{pa}|\alpha| e^{j(\omega t - \beta ca - \Phi_{ca})}$$

where $P_a'$ = time varying pressure on center airfoil c at time t due to vibration of airfoil a when both airfoils are vibrating at frequency $\omega$ and amplitude $\alpha$ but phase displaced by phase angle $\Phi_{ca}$. As used hereafter in this specification P' represents the time varying pressure on center airfoil c due to vibration of one of the other airfoils when both the center airfoil and the other airfoil are vibrating harmonically and the subscript identifies the airfoil which is vibrating in addition to the center airfoil. It follows directly, then, that the total time varying pressure on center airfoil c at transducer 34' due to simultaneous vibration of the center airfoil c and all of the other airfoils a, b, d and e is the summation of $P_a' + P_b' + P_c' + P_d' + P_e'$.

Having thus described the data collection procedure according to this invention with respect to a specific example, some generalizations can be stated. First, while a five airfoil cascade has been shown and described, the number of airfoils in the cascade can be varied. Further, while a linear cascade has been shown and described, an annular cascade can also be used as long as it can be properly positioned in the fluid stream. Regardless of the type of cascade, the procedure according to this invention contemplates vibrating those individual airfoils in the cascade on the upstream side of the center airfoil and on the downstream side of the airfoil which are not too remote from the center airfoil. Thus, in a large annular cascade with many airfoils on opposite sides of the center airfoil, airfoils four, five or more spaces from center might be too remote from the center airfoil to produce significant data. Thus if remoteness is demonstrated by lack of significant response at the center airfoil, the too remote airfoils need not be vibrated.

Continuing, it will also be apparent that the procedure according to this invention, while described with respect to a time varying pressure example, is adapted for collection of data relative to other time varying parameters and to harmonic vibration in modes other than torsional. For example, the airfoils in cascade 14 could be subjected to lateral vibration in the same sequence as described with respect to torsional vibration and transducers would be provided to sense time varying pressure, time varying temperature, or any other time varying parameter of interest. In any case the data reduction procedure is the same and yields results which reflect the behavior of the time varying parameter when all of the airfoils vibrate simultaneously.

It will be further apparent that since the amplitude of vibration and the phase relationship between vibration of the center airfoil and vibration of the other individual airfoils are arbitrarily assumed, it is possible to mathematically examine many combinations of amplitudes and phase relationships without the necessity of actually performing a corresponding number of physical tests.

Figure 4:
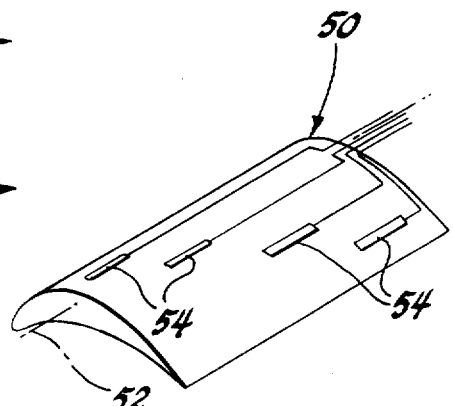
FIG. 4 is similar to FIG. 2 but showing an instrumented airfoil of different configuration.

Finally, with reference to FIG. 4, the procedure according to this invention is not limited to airfoils modeled after compressor blades but may equally be applied to structures such as airfoils 50 modeled after a turbine vane. In carrying out the procedure, the airfoil 50 is disposed in the wind tunnel 10 as described with respect to airfoils a, b, c, d and e for pivotal movement about an axis 52 except that the wind tunnel must be modified to direct the fluid stream at the cascade at the proper angle of attack. A plurality of transducers 54 are embedded in the surfaces of the airfoil 50 and function as described with respect to transducers 34. The data provided by the transducers is, then, collected and reduced as described hereinbefore.

The embodiments of the invention in which an exclusive property or privilege is claimed are defined as follows:

1. A procedure for collecting experimental data reflecting the behavior of a time varying aerodynamic parameter at an airfoil in a cascade of harmonically vibrating airfoils comprising the steps of placing said cascade of airfoils in a wind tunnel, subjecting said cascade to a continuous steady state fluid stream in said wind tunnel, vibrating a center airfoil of said cascade at a selected frequency and a selected amplitude while all of the other of said airfoils in said cascade are held rigid, measuring a time varying parameter at said center airfoil during vibration thereof, vibrating in turn and in said fluid stream each of said other airfoils at said selected frequency but at an arbitrarily selected amplitude which all of the remaining airfoils in said cascade including said center airfoil are held rigid, measuring said time varying parameter at said center airfoil during vibration of each individual one of said airfoils, and combining all of said time varying parameter measurements to reflect the behavior of said time varying parameter at said center airfoil when all of said airfoils in said cascade including said center airfoil are vibrated harmonically at said selected frequency and at the same amplitude.

2. A procedure for collecting experimental data reflecting the behavior of a time varying aerodynamic parameter at an airfoil in a cascade of harmonically vibrating airfoils comprising the steps of placing said cascade of airfoils in a wind tunnel, subjecting said cascade to a continuous steady state fluid stream in said wind tunnel, vibrating a center airfoil of said cascade at a selected frequency and a selected amplitude while all of the other of said airfoils in said cascade are held rigid, measuring a time varying parameter at said center airfoil during vibration thereof and expressing said measurement as a function of the position of said center airfoil in its vibratory cycle, vibrating in turn and in said fluid stream each of said other airfoils at said selected frequency but at an arbitrarily selected amplitude while all of the remaining airfoils in said cascade including said center airfoil are held rigid, measuring said time varying parameter at said center airfoil during vibration of each individual one of said airfoils and expressing each individual measurement as a function of the position of the corresponding one of said individually vibrating airfoils in its vibratory cycle, expressing the position of each of said individually vibrating airfoils in its vibratory cycle as a function of the position of said center airfoil in its vibratory cycle, and combining all of said time varying parameter measurements expressed as functions of individually vibrating airfoil positions and all of said individual airfoil positions expressed as functions of the position of said center airfoil in its vibratory cycle to reflect the behavior of said time varying parameter at said center airfoil when all of said airfoils in said cascade including said center airfoil are vibrated harmonically at said selected frequency and at the same amplitude.

3. The improved procedure recited in claim 2 wherein the time varying parameter being measured is the fluid pressure at a surface of said airfoil.

* * * * *